(12) United States Patent
Furukawa et al.

(10) Patent No.: US 6,897,921 B2
(45) Date of Patent: May 24, 2005

(54) METHOD OF MANUFACTURING ELECTRODE BASE MEMBER AND REFLECTING MEMBER FOR LIQUID CRYSTAL DISPLAY DEVICE

(75) Inventors: Tadahiro Furukawa, Tokyo (JP); Kimikazu Okayasu, Tokyo (JP); Hisashi Sato, Tokyo (JP); Tatsuhiko Murai, Tokyo (JP)

(73) Assignee: Kyodo Printing Co., Ltd. (JP)

( * ) Notice: Subject to any disclaimer, the term of this patent is extended or adjusted under 35 U.S.C. 154(b) by 161 days.

(21) Appl. No.: 09/971,005

(22) Filed: Oct. 5, 2001

(65) Prior Publication Data

US 2002/0093610 A1 Jul. 18, 2002

(30) Foreign Application Priority Data

Oct. 13, 2000 (JP) ........................................ 2000-312971
Jun. 29, 2001 (JP) ........................................ 2001-198800

(51) Int. Cl.[7] ........................ G02F 1/335; G02B 7/182; C23C 4/08
(52) U.S. Cl. ........................ 349/113; 359/850; 427/455
(58) Field of Search ........................ 349/113; 359/850; 427/455

(56) References Cited

U.S. PATENT DOCUMENTS

| | | | | |
|---|---|---|---|---|
| 4,519,678 A | * | 5/1985 | Komatsubara et al. | 349/160 |
| 5,317,141 A | * | 5/1994 | Thomas | 250/491.1 |
| 5,574,292 A | * | 11/1996 | Takahashi et al. | 259/59 |
| 6,127,199 A | * | 10/2000 | Inoue et al. | 438/30 |
| 6,130,736 A | * | 10/2000 | Sasaki et al. | 349/122 |
| 6,168,851 B1 | * | 1/2001 | Kubota | 428/200 |
| 6,233,031 B1 | * | 5/2001 | Ishitaka | 349/113 |
| 6,538,711 B2 | * | 3/2003 | Funahata et al. | 349/113 |

FOREIGN PATENT DOCUMENTS

| | | |
|---|---|---|
| JP | 4-267220 | 9/1992 |
| JP | 2000-171792 | 6/2000 |
| JP | 2000-193807 | 7/2000 |
| JP | 2000-258615 | 9/2000 |
| JP | 2000-267088 | 9/2000 |
| KR | 1998-071386 | 10/1998 |

* cited by examiner

Primary Examiner—Toan Ton
Assistant Examiner—Hoan C. Nguyen
(74) Attorney, Agent, or Firm—Lorusso, Loud & Kelly

(57) ABSTRACT

A reflecting member having roughness is formed on a surface above a substrate and transferred onto a film with an adhesive layer interposed therebetween. For example, a removable organic insulating layer having roughness on a surface thereof is formed above a glass substrate, and then a metal layer is formed on the rough surface of the organic insulating layer, thus forming a reflecting member. The reflecting member is then transferred onto the film with and adhesive layer interposed therebetween.

14 Claims, 7 Drawing Sheets

FIG.2A
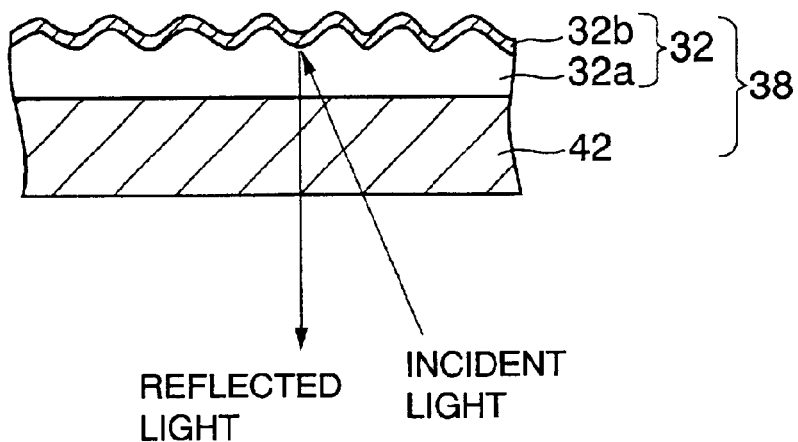
FIG.2B
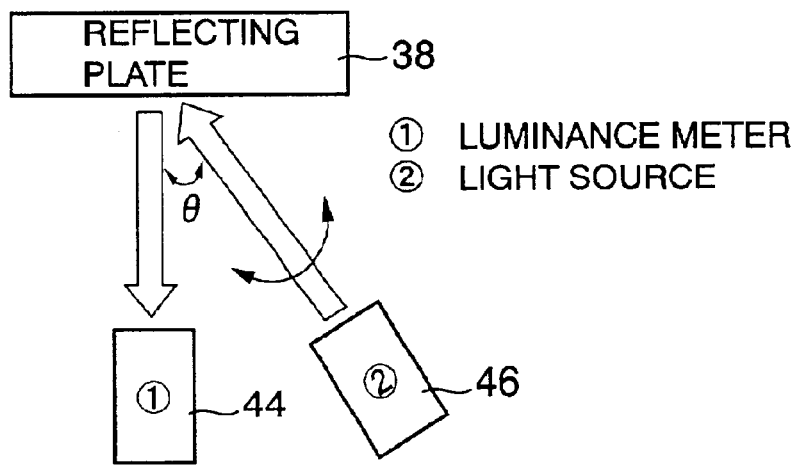
FIG.2C
|  | 7.4° | 17.7° | 22.3° | 26.6° | 31.8° | 35.6° |
|---|---|---|---|---|---|---|
| COMPARATIVE SAMPLE | 493 | 278 | 218 | 99 | 91 | 11 |
| THE REFLECTING MEMBER | 443 | 279 | 222 | 173 | 134 | 91 |

METHOD OF MANUFACTURING ELECTRODE BASE MEMBER AND REFLECTING MEMBER FOR LIQUID CRYSTAL DISPLAY DEVICE

BACKGROUND OF THE INVENTION a) Field of the Invention

The present invention relates to a method of manufacturing an electrode base member and a reflecting member for a reflective (semi-transmissive) type liquid crystal display device including a film or the like as a base member, to an electrode base member and a reflecting member manufactured by the method, and to a liquid crystal display device including the electrode base member and the reflecting member.

b) Description of the Prior Art

In recent years, applications of liquid crystal display devices have rapidly widened and now include use in information appliances and the like owing to their characteristics such as low power consumption, low voltage operation, light weight, thinness and capability for color display.

In particular, a reflective simple matrix liquid crystal display device is drawing attention as suitable for a portable terminal device, owing to its low power consumption and lack of need for a backlight.

In this simple matrix liquid crystal display device, plural stripe-shaped transparent electrodes are formed on two base members, and the two base members are disposed in such a manner that the transparent electrodes of the two base members are perpendicular to each other. Liquid crystal is filled into a space between the two base members and pixel electrodes are formed at positions corresponding to each intersection point of two mutually perpendicular transparent electrodes. Thus, images can be displayed by controlling the liquid crystal.

A reflective liquid crystal display device includes a reflecting member for diffusing and reflecting external light for illumination. The reflecting member of the reflective liquid crystal display device is categorized into two types: one is an outward reflecting member type in which the reflecting member is formed on a plane opposite a liquid crystal layer of the base member, and the other is an inward reflecting member type in which the reflecting member is formed on a plane facing toward the liquid crystal layer of the base member.

Since the reflecting member is formed opposite the liquid crystal layer of the base member in the outward reflecting member type, the external light diffused and reflected by the reflecting member is first transmitted through the base member and then through the liquid crystal layer, and finally is emitted out of a display screen. In such devices, reflected light may cause parallax attributable to the thickness of the base member, resulting in defocused images such as double images or color-blending.

Since the reflecting member is formed facing the liquid crystal layer of the base member in the inward reflecting member type, the external light diffused and reflected by the reflecting member is transmitted through the liquid crystal layer without passing through the base member, and is then emitted at the display screen. Since the reflecting member and the liquid crystal layer are designed to exclude the influences on the reflected light by the thickness of the base member, parallax does not occur, whereby the defocused images are eliminated.

When a film is used as the base member, the film can be made thinner than a glass base. Accordingly, the parallax may be reduced to that extent. Nevertheless, when a color filter is included in the liquid crystal display device, one pixel is divided into three color dots, each dot having one-third the size of the pixel. In this case, the reflected light may be transmitted through untargeted dots more easily than in a monochrome liquid crystal display device. Thus, the influence of the film thickness becomes negligible.

Therefore, even if a film is used as the base member, the inward reflecting type should be adopted, particularly for a color liquid crystal display.

However, the liquid crystal display device of the inward reflecting member type tends to have a complex structure and, accordingly, manufacture thereof may be difficult.

When a film is used as the base member, the film tends to expand or contract under influences of heat or humidity and thus materials and process conditions are restricted.

The reflecting member has a rough surface in order to fulfill its function to diffuse and reflect the external light. Because this roughness may adversely affect driving of the liquid crystal, sophisticated planarization technology is specially required, which may raise manufacturing costs or reduce process yields.

Moreover, a metal layer formed as the reflecting member may be damaged in the course of subsequent chemical treatment performed in forming the transparent electrodes or the like. Furthermore, since a film is used as the base member, the film tends to expand or contract under the influences of heat and humidity, thus restricting the materials and manufacturing conditions for the reflecting member and the transparent electrodes. Accordingly, it becomes difficult to manufacture an electrode base member of a liquid crystal display device which corresponds to the design demands.

In addition, the following problems are observed in the manufacture of an electrode base member for a liquid crystal display device of a semi-transmissive type, which is designed to use both a backlight and reflected external light as light sources, by means of forming a reflecting member or the like directly on a film. In this case, a reflecting member made of a metal layer is first formed covering the entire surface of the film. Then, portions of the metal layer, corresponding to the pixel of the transparent electrodes to be formed in a subsequent step, need to be partially removed with high accuracy in order to allow the back light to be transmitted therethrough. The portions to be removed have areas smaller than the pixels of the transparent electrodes.

The ITO serving as the transparent electrodes is formed in such a manner that the portions of the transparent electrodes to be the pixels overlap the areas in which the reflecting member made of the metal layer is removed. A resist layer is formed on the ITO while aligning the resist layer and the ITO with good accuracy. After exposing and developing the resist layer the ITO is removed. This process requires a high degree of alignment accuracy.

However, a film made of plastic is expanded easily just by water washing, for example, and, conversely, the film contracts when dried. In addition, such expansion or contraction is not immediately stabilized, and requires a long period of time to stabilize. In other words, for example, once the film is contracted, dimensions of the patterns formed on the film show that contraction for a long period of time. In such a situation, reproducibility of the above-mentioned alignment is difficult to obtain.

Therefore, it is difficult to manufacture the electrode base member for the semi-transmissive liquid crystal display device by means of forming the reflecting member or the transparent electrodes directly on the film.

Another proposed method for forming the reflecting member involves creating roughness on a surface of a resin layer, such as a resist layer, by photolithography using a photomask and forming a metal layer to reflect light on this rough surface.

However, in forming roughness on the surface of a resin layer, such as the resist layer, by photolithography, simple repetition of planar patterns on the reflecting member may cause the reflecting member to function as a diffraction grating. Accordingly, when the liquid crystal display screen is viewed, defects such as iridescence or so-called moire fringes may occur due to subtle errors in positioning relative to other repetitive patterns of wiring, black matrices or the like. For this reason, simple duplicative patterns such as pixel patterns cannot be used in designing the photomask for forming the rough patterns, and extremely vexatious and complicated designing is required. Thus, it is not easy to form reflecting members having proper diffusing capacity by normal photolithographic methods.

Other methods for forming roughness on a resin surface of resin are also known, such as: incorporation of diffusing particles of a different material into the resin (Japanese Patent Publication Hei 4-267220); use of phase separation of two different types of resin upon curing (Japanese Patent Publication 2000-193807); and forming roughness by curing a surface portion of the resin on its surface side and exposing and baking while leaving its interior uncured (Japanese Patent Publication 2000-171792).

In forming a reflecting member directly on a plastic film having a thickness from 50 to 200 µm by use of the above-mentioned conventional methods, stress upon curing of the resin may form cambers in the plastic film.

In addition, the reflecting member manufactured in accordance with any of the foregoing manufacturing methods would have a composition of materials that are virtually different in refractive indices on opposing sides of a boundary such as an interface of the resin and the particles or an interface of separated phases. When the rough face of the reflecting member is formed on the side of the liquid crystal layer opposite the electrode base member, incident light is polarized by a polarizing plate, subsequently transmitted through the interface of the materials of the different refractive indices via the liquid crystal layer, and then reflected by the metal layer. In this event, the polarized incident light and the light dispersed by the metal layer may show depolarization due to reflection at the interface of the materials of the different refractive indices whereby the degree of polarization of the light is reduced. Accordingly, when a reflecting member composed of materials having different refractive indices is used in a liquid crystal display device of the inward reflecting member type, it is likely that the contrast ratio of the liquid crystal display screen will be reduced.

SUMMARY OF THE INVENTION

An object of the invention is to provide a method of manufacturing an electrode base member for a liquid crystal display device at low cost and with high yield, without restrictions on materials or manufacturing conditions.

Another object of the present invention is to provide a method of manufacturing a reflecting member for a liquid crystal display device, which device avoids the aforementioned depolarization of light and can be readily manufactured.

The present invention relates to a method of manufacturing an electrode base member for a liquid crystal display device comprising the steps of forming a reflecting member having a rough surface above a substrate, and transferring the reflecting member from the substrate onto a film with an adhesive layer interposed therebetween.

According to the present invention, since the reflecting member is formed on a heat-resistant substrate, material of the reflecting member and manufacturing temperatures are not restricted. In addition, since the roughness of the reflecting member is readily planarized by the adhesive layer upon transferring therewith, sophisticated planarization technology is not required. Therefore, electrode base members for a liquid crystal display device corresponding to design demands can be manufactured with high yields and low costs.

The liquid crystal display device of inward reflecting member type including the electrode base members manufactured in accordance with the above-described method of manufacturing does not allow light diffused and reflected by the reflecting member formed on a film to be transmitted through the film. Accordingly, parallax hardly occurs therein and clear images can be thereby obtained, i.e., without defocusing. Moreover, due to the nature of the layers of the electrode base members, the roughness on the surface of the reflecting member does not affect smoothness of the liquid crystal layer and, therefore, does not affect driving of the liquid crystal.

Preferably, the method further includes a step of forming transparent electrodes on the substrate prior to forming the reflecting member and subsequently transferring onto the film with the adhesive layer interposed therebetween. In this case, the order of formation of the layers is reverse that in the case of direct formation, to provide for transfer. In other words, the reflecting member is formed after the formation of the transparent electrodes, whereby damage to the reflecting member is prevented.

In another preferred mode thereof, the forming of the reflecting member includes the steps of forming an insulative organic layer having roughness on a surface thereof, and covering the rough surface with a metal layer.

The film itself contains air, water or the like, and the film also possesses high air permeability and moisture permeability. Therefore, outside air or air contained in the film may penetrate the liquid crystal layer and thus cause air bubbles, or moisture may deteriorate the liquid crystal display device.

In the preferred embodiments, the reflecting member having a metal layer is formed on the liquid crystal side of the film, and thereby also functions as a gas barrier layer to block air and moisture. The metal layer blocks not only the outside air or the outside moisture, but also the air and the moisture contained in the film itself. Accordingly, formation of a gas barrier layer on the liquid crystal layer side of the film is not particularly required and, therefore, manufacturing costs can be further reduced and the yields can be enhanced.

In another preferred embodiment, the method further includes the step of removing parts of the metal film, corresponding to pixels of the transparent electrodes, with areas smaller than areas of the portions of the transparent electrodes which become the pixels.

In the preferred embodiments, since the transparent electrodes and the reflecting member are formed on a substrate of glass or the like that does not expand or contract, patterns on the respective layers can be accurately aligned and formed together. In other words, the metal layer, serving as the reflecting member, is formed to remain surrounding the periphery of each of the pixel portions of the transparent electrodes, and the metal is removed in the center of each of the pixel portions in an aligned manner such that the area where the metal has been removed is smaller than the area of the pixel portion, i.e., about 10% to 20% of the area of the pixels.

Accordingly, when a backlight is used as a light source, light is transmitted through the areas where the metal layer has been removed (windows), corresponding to the pixel portions, whereby images can be displayed. Moreover, when external light is used as a light source, the external light is reflected where the metal layer is present, whereby images can be displayed. In this way, a semi-transmissive liquid crystal display device using a film as a base member is provided.

Moreover, the present invention relates to a method of manufacturing a reflecting member for a liquid crystal display device, the method comprising the steps of: preparing a precursor solution for an organic insulating film; producing a solution containing a partially cured intermediate derived from a part of a precursor in the precursor solution, the part of the precursor being at least partially subjected to any of cyclization, condensation, cross-linking and polymerization; producing a coating liquid based on the solution containing the partially cured intermediate; forming a coated layer provided with roughness on its surface by applying the coating liquid to a substrate; forming the organic insulating layer provided with roughness on its surface by heating the coated layer to completely cure the coated layer; and forming a metal layer on the rough surface of the organic insulating layer.

According to the foregoing embodiment of the present invention, the precursor solution of the organic insulating layer is first prepared and then the solution containing the partially cured intermediate is produced.

By heating the precursor solution, for example, part of the precursor in the precursor solution at least partially undergoes cyclization, condensation, cross-linking or polymerization. Thus, the solution containing the partially cured intermediate is produced. Alternatively, a solid may be extracted from the precursor solution to obtain a precursor solid, and the precursor solid may be heated for partial curing, and thus an intermediate solid can be obtained. Thereafter, the intermediate solid may be dissolved in a solvent to produce a solution containing the partially cured intermediate.

Thereafter, the coating liquid is produced from a solution containing the partially cured intermediate in a solvent wherein solubility of the intermediate is low. Then the coating liquid is applied onto an object to form the coated layer. Since the dissolved intermediate is contained in the coated layer in a state of low solubility, the intermediate separates out when the coated layer is heated. Accordingly, roughness is formed on the surface of the coated layer owing to protrusions of the intermediate.

Next, by heating the coated layer so as to completely cure same, the organic insulating layer is formed, which layer is formed of a single material and has a rough surface. Subsequently, the metal layer is formed on the rough surface of the organic insulating layer, to complete manufacture of the reflecting member.

As described above, the present invention is designed to form a rough surface on the organic insulating layer by forming the organic insulating layer from a solution containing the partially cured intermediate. Accordingly, the reflecting member having a rough surface can be formed by the extremely simple steps described above. In addition, the organic insulating layer of the reflecting member thus formed is composed of the single material including its rough portions, and, accordingly, its refractive index is uniform. Accordingly, when the roughness of the reflecting member is disposed on the side of the base member opposite the liquid crystal layer, in the case of the inward reflecting member type, it is possible to prevent the depolarization which leads to reduction in the degree of polarization of the incident light. In this way, the contrast of the reflective (semi-transmissive) liquid crystal display device can be enhanced.

In a preferred embodiment the forming of the coating liquid further includes a step of mixing a solvent and the precursor of the organic insulating layer with the solution containing the partially cured intermediate, the solvent being virtually incapable of dissolving the intermediate. In this manner, fine roughness is apt to form on the surface of the organic insulating layer as the solubility of the intermediate in the solvent becomes lower and as uniformity of curing rate of the precursor in the solution containing the partially cured intermediate becomes lower. Thus, shape of the roughness becomes more controllable. Accordingly, it is preferable to produce the coating liquid in such a manner that a nonsolvent or a poor solvent, in which the intermediate is virtually insoluble, is mixed with the solution containing the partially cured intermediate in order to reduce solubility of the cured portion of the intermediate, and the precursor of the organic insulating layer is added therein. Therefore, the coating liquid contains the partially cured intermediate and the uncured precursor coexisting in the solution.

BRIEF DESCRIPTION OF THE DRAWINGS

FIG. 2A is a partial cross-sectional view showing structure of a reflecting member subjected to evaluation of its reflection characteristics, FIG. 2B is a schematic diagram showing a system of measurement of luminance of the reflecting member, and FIG. 2C is a chart showing the reflection characteristics determined for the reflecting member.

DESCRIPTION OF THE PREFERRED EMBODIMENTS

Hereinbelow, embodiments of the present invention will be described with reference to the accompanying drawings.

First Embodiment
(First Method of Manufacturing a Reflecting Member)

First, a method of manufacturing a reflecting member for a liquid crystal display device according to a first embodiment of the present invention will be described.

Figure 1A:
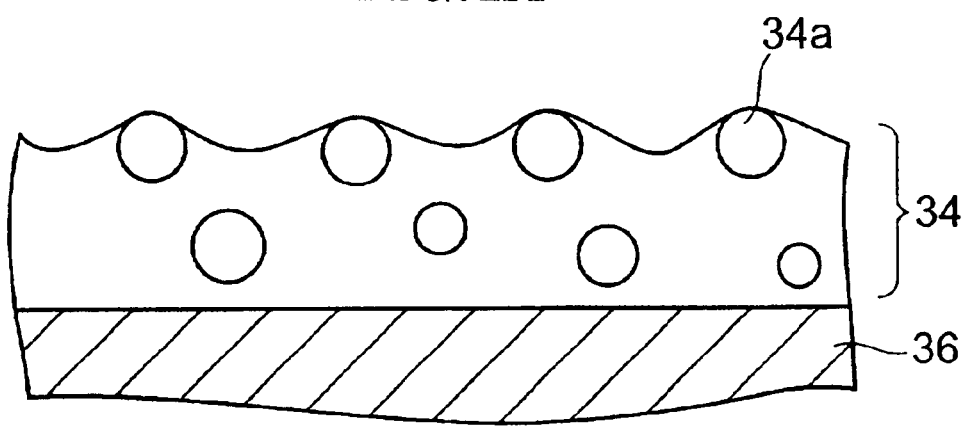
FIG. 1A is a partial cross-sectional view schematically showing an aspect of formation of a coated layer in accordance with a method of manufacturing a reflecting member for a liquid crystal display device according to a first embodiment of the present invention.
Figure 1B:
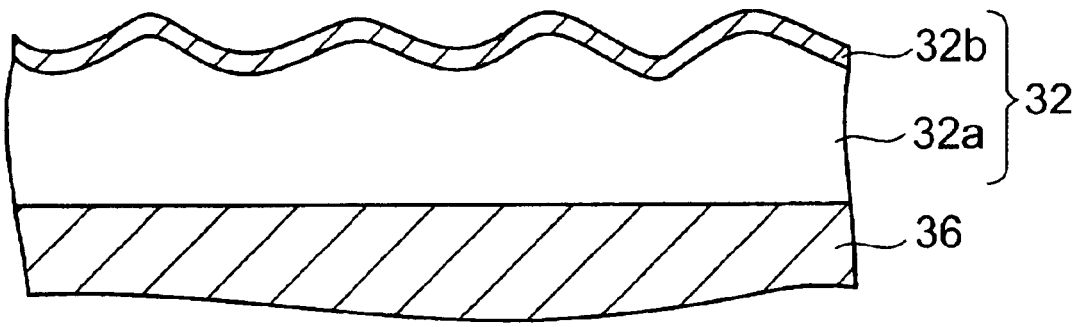
FIG. 1B is a partial cross-sectional view showing the reflecting member manufactured in accordance with the method of forming a reflecting member according to the first embodiment of the present invention.

FIG. 1A is a partial cross-sectional view schematically showing a stage in formation of a reflecting member according to the first embodiment of the present invention, and FIG. 1B is a partial cross-sectional view showing the completed reflecting member manufactured in accordance with the method of the first embodiment of the present invention.

In the first method, a precursor solution is prepared for forming a polyimide layer, which is one example of an organic insulating layer. In this step, 3,3'-diaminodiphenyl sulfonic acid and benzophenone tetracarbonic acid anhydride liquid are subjected to condensation in dimetylacetoamide by a known method of condensation to obtain a polyimide precursor solution (18% solids). This reaction is represented below in Formula 1.

[FORMULA 1]

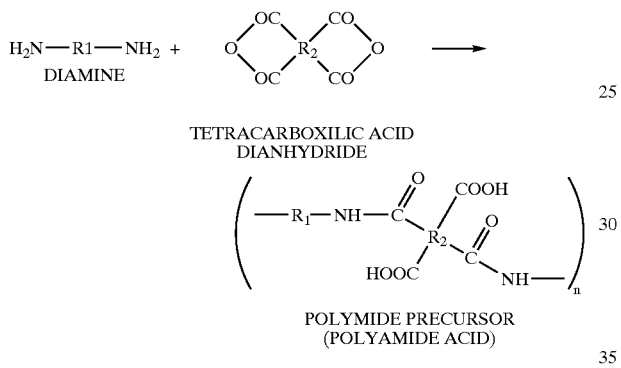

Subsequently, 300 g of the polyimide precursor solution is heated and stirred at 150° C. for 60 minutes in order to cure a part of the precursor in the polyimide precursor solution by imidization. Accordingly, a solution containing a partially imidized (partially cured) intermediate is produced. FORMULA 2 is a general formula for the polyimide layer obtained by heating the polyimide precursor. The embodiment of the present invention is not designed to imidize the precursor solution completely into polyimide but, rather, is designed to imidize only a predetermined portion of the precursor.

[FORMULA 2]

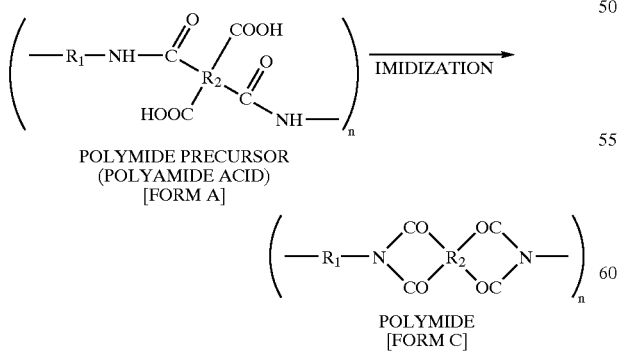

To be more specific, by heating and stirring the polyimide precursor solution under given conditions, hydrogen atoms of an amide group of the polyimide precursor and a carboxyl react for cyclization by dehydration, whereby an intermediate group (FORM B) is formed according to the reaction of FORMULA 2, an imide group (FORM C) is formed as shown in FORMULA 3. Moreover, FORM A (unreacted polyimide precursor group) in which no dehydration occurs is also present in a molecular chain.

In other words, within the molecular chain of the polyimide precursor (partially imidized), structures of FORM A (the polyimide precursor groups), FORM B (the intermediate group) and FORM C (the imide group) are coexistent.

[FORMULA 3]

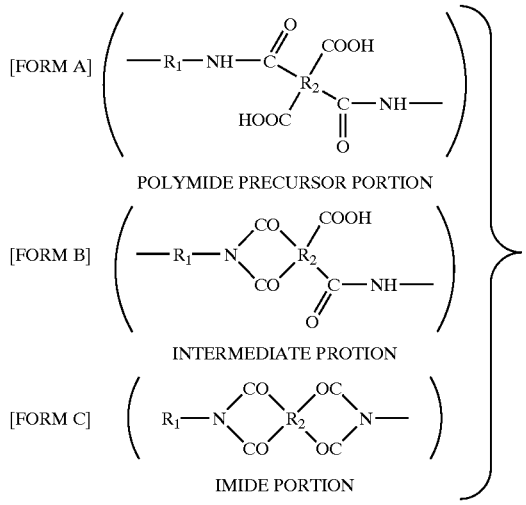

A state where the polyimide precursor is partially imidized can be expressed as FORMULA 4.

[FORMULA 4]

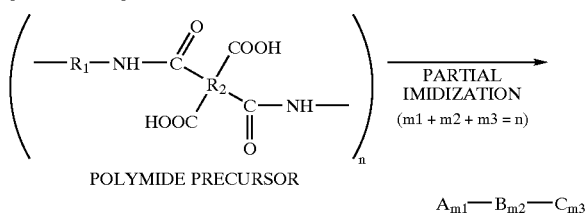

For example, under the above-described conditions, about 45% to 50% of the precursor is imidized and cured. An imidization ratio, which is a proportion of the precursor being partially imidized, can be readily adjusted by varying heating temperatures or time, and the imidization ratio is preferably set within a range of 30% to 90%. The imidization ratio will be described in detail in accordance with a second method of manufacturing a reflecting member.

It should be noted that the step of partially imidizing the polyimide precursor has a risk of generating water in the course of imidization by dehydration and cyclization of the polyimide precursor. Accordingly, the water may cause hydrolysis of amides in the polyimide precursor or chain scissioning, whereby stability of the polyimide precursor is reduced. Therefore, it is preferable to add 100 g of zeolite (a molecular sieve), for example, to the polyimide precursor solution upon heating and stirring. Since the zeolite functions as a molecular sieve, the water generated in the course of imidization is thereby removed.

Subsequently, after the solution containing the partially cured intermediate is cooled, the zeolite, if used therein, is removed by filtration. Thus, the solution containing the partially cured intermediate including the partially imidized precursor can be produced.

Next, one example of the step of producing a coating liquid will be described. First, a uniform coating liquid is produced by mixing 100 weight parts of the solution containing the partially cured intermediate, 100 weight parts of cyclohexane and 30 weight parts of a polyimide precursor having the same structure as the precursor within the above-described precursor solution.

Note that the cyclohexane used therein is one example of a nonsolvent, i.e., a medium that does not dissolve the intermediate in the solution containing the partially cured intermediate. Therefore, a poor solvent such as methyl cellosolve that virtually does not dissolve the intermediate may be used instead.

In this step, as solubility of the intermediate is reduced by mixing a nonsolvent or a poor solvent that does not dissolve the cured portion of the intermediate, the above-described intermediate and a precursor solution yet to be subjected to cyclization by dehydration are coexistent in the solution, and those substances separate in an uneven state so as to form a rough surface. Accordingly, as described above, it is preferable to produce the coating liquid by mixing the solution containing the partially cured intermediate with a nonsolvent or poor solvent and the precursor solution including the polyimide precursor having the same structure as the precursor in the precursor solution.

Subsequently, as shown in FIG. 1A, a given amount of the above-described coating liquid is coated on a base member 36 by a spin coating method or the like, and then the base member is revolved, for example at 1000 rpm for 12 seconds, to dry the liquid thereon by air currents, whereby a coated layer 34 is formed. The coated layer 34 contains, dissolved therein, an intermediate 34a that is the partially imidized polyimide precursor in a state where the solubility of the intermediate with respect to the solvent is low. Accordingly, drying of the coated layer 34 by air allows the intermediate 34a to separate while a considerable amount of the solvent still remains in the coated layer. Therefore, some parts of particles of the intermediate 34a protrude to form roughness on a surface of the coated layer 34.

Subsequently, the coated layer 34 is subjected to heat treatment at 200° C., for example, whereby an uncured portion in the coated layer 34 is cured completely by imidization. Accordingly, a polyimide layer 32a with roughness formed on its surface is formed as shown in FIG. 1B. This polyimide layer 32a is formed in such a manner that its rough portion and other portions thereof are cured by imidization, both of the portions being composed of the same precursor. Therefore, the polyimide layer 32a is formed of the same material on the whole, including its rough portion; in other words, it is formed with a uniform refractive index as a whole.

According to the method of manufacturing a reflecting member of the first embodiment, the reflecting member can be formed to have random heights of the protrusions providing roughness as well as random planar spacing, varying here and there on the surface. For example, the heights of the protrusions are set to 2 $\mu$m or lower, preferably in a range from 0.2 to 0.4 $\mu$m, and the planar spacing ("pitches") of the rough surface are set to 0.5 to 10 $\mu$m, preferably in a range from 5 to 6 $\mu$m. In order to provide roughness as described above, the proportions in mixing to form the coating liquid should be adjusted based on the above-described proportions of the above-described solution containing the partially cured intermediate, cyclohexane and the polyimide precursors.

Subsequently, the polyimide layer 32a with the rough surface is subjected to cooling by air current for 30 minutes, and then an Al (aluminum) layer 32b is formed in a thickness of, for example 50 to 100 nm, on the rough surface of the polyimide layer 32a by a vacuum deposition method or the like, the Al layer 32b being one example of a metal layer.

Accordingly, a reflecting member 32 including the polyimide layer 32a and the Al layer 32b formed on the rough surface of the polyimide layer 32a can be manufactured as shown in FIG. 1B.

Note that the metal layer may also include any one of Ti (titanium), Ag (silver), Pt (platinum), Ta (tantalum), Pa (palladium), or an alloy containing any of the above. In other words, any metal apt to reflect light may be used.

Moreover, the method of forming the metal layer may be a sputtering method, an ion plating method or the like, instead of the vacuum deposition method.

According to the first method of forming a reflecting member, the intermediate derived from the partially imidized polyimide precursor is prepared to form the roughness, and thereafter, the polyimide layer provided with the roughness thereon is formed by complete imidization thereof. In this way, extremely simple steps can effectuate formation of the polyimide layer 32a, including the rough portion, which constitutes the reflecting member. In addition, the whole polyimide layer including the rough portion is eventually composed of one kind of polyimide; and, accordingly, the refractive index of the whole polyimide layer can be made uniform.

In this way, even in the case where the rough surface of the reflecting member is disposed opposite to the liquid crystal layer on the base member, incident light and reflected light that is the incident light reflected by the metal layer, are transmitted through the polyimide layer having the uniform refractive index. Therefore, problems such as reduction in polarization of the light are avoided. In addition, since the polyimide layer has high transparency, reduction in reflectivity of light becomes insignificant.

(Second Method of Manufacturing a Reflecting Member)

A difference between the first method of manufacturing a reflecting member and the second method of manufacturing a reflecting member lies in the method of producing the solution containing the partially cured intermediate. In referring to FIG. 1A and FIG. 1B, detailed description of the same steps as those in the first method of manufacturing a reflecting member will be omitted.

In the second method of manufacturing a reflecting member, the polyimide precursor solution (18% solids) is first produced according to a method similar to the first method of manufacturing a reflecting member.

Thereafter, the polyimide precursor solution is subjected to solidification while adding methanol or the like and then dried, whereby the solid of the polyimide precursor separate from the polyimide precursor solution and a solid precursor of the polyimide layer (the organic insulating layer) is thereby obtained.

Subsequently, the solid precursor of the polyimide layer is subjected to heating at a temperature of 120° C. to 170° C., thus partially imidizing the solid precursor to produce a solid intermediate. Although water is generated upon partial imidization of the solid precursor, such water is discharged to the atmosphere upon heating for imidization in the second method of manufacturing a reflecting member. Accordingly, a dehydrating agent such as zeolite is not required.

Subsequently, the solid intermediate is dissolved in a solvent, thus producing the solution containing the partially cured intermediate. As the solvent, for example, any one of N-methylpyrrolidone (NMP), dimethylformaldehyde (DMF) and dimethylacetoamide (DMAc), or a mixed liquid thereof can be used.

Subsequently, the coating liquid is produced according to a method similar to the first method of manufacturing a reflecting member, and it is coated on the base member, whereby a layer similar to the coated layer 34 with roughness on its surface as shown in FIG. 1A is formed.

Extensive research regarding the imidization ratio has determined that desired roughness can be formed on the surface of the coated layer 34 when the imidization ratio for the solid intermediate derived from the partially imidized solid precursor is in a range of about 30% to 90%.

TABLE 1 shows the imidization ratio dependency for the solid intermediate in the surface of the coated layer.

COMPOSITION 2 and the coating liquids of COMPOSITION 3, plural types of coating liquids were severally produced by means of varying proportions of ingredients that constituted each of the coating liquids.

Thereafter, these plural coating liquids were severally coated on substrates and air dried, whereby coated layers were formed. Then, dependency of the surface states of the coated layers on the imidization ratios and on the compositions of the respective coating liquids were observed.

It should be noted that a range indicated as "suitable" in TABLE 1 refers to a state where a desired roughness is formed on a surface of a coated layer, which has the protruded heights and spacings as described in connection with the first method of manufacturing a reflecting member.

The coating liquid No. 1 with an imidization ratio of 0% provided a coated layer naturally specula, and lacking the desired roughness.

Coating liquid No. 2 with an imidization ratio of 30%, provided a roughness on the surfaces of the coated layers

TABLE 1

IMIDIZATION RATIO DEPENDENCY OF SURFACE STATE OF COATED FILM

| | | | | SURFACE STATE OF COATED FILM | | |
|---|---|---|---|---|---|---|
| No. | TEMPERATURE (° C.) | TIME (MINUTE) | IMIDIZATION RATIO (%) | COATING LIQUID OF COMPOSITION 1 (SOLID INTERMEDIATE + DMAc) | COATING LIQUID OF COMPOSITION 2 (SOLID INTERMEDIATE + DMAc + CYCLOHEXANE) | COATING LIQUID OF COMPOSITION 3 (SOLID INTERMEDIATE + DMAc + CYCLOHEXANE + PRECURSOR) |
| 1 | — | — | 0 | NOT SUITABLE (SPECULAR) | | |
| 2 | 130 | 60 | 30 | ←SUITABLE→ | | NOT SUITABLE (SEMISPECULAR ~ SPECULAR) |
| 3 | 140 | 60 | 37 | NOT SUITABLE (UNEVENNESS) | ←SUITABLE→ | NOT SUITABLE (SEMISPECULAR ~ SPECULAR) |
| 4 | 150 | 60 | 50 | NOT SUITABLE (UNEVEN REGION) | ←SUITABLE→ | NOT SUITABLE (SEMISPECULAR ~ SPECULAR) |
| 5 | 160 | 40 | 75 | NOT SUITABLE (UNEVEN REGION) | ←SUITABLE→ | NOT SUITABLE (SEMISPECULAR ~ SPECULAR) |
| 6 | 170 | 30 | 90 | | NOT SUITABLE (UNEVEN REGION) | ←SUITABLE→ |
| 7 | 260 | 30 | 100 | NOT SUITABLE (UNDISSOLVED) | | |

In an experiment, a plurality of the solid intermediates were produced in accordance with the above-described method in such a manner that they vary in imidization ratios for the solid intermediates derived from the partially imidized solid precursor in a range from 0% to 100%. Then, temperatures, time and the like required for heating the solid precursor are set to predetermined conditions, thus obtaining solid intermediates imidized at a desired imidization ratio. Thereafter, each of the plurality of the solid intermediates imidized by desired ratios was dissolved in DMAc to form the "coating liquids of COMPOSITION 1". Moreover, each of the plurality of the solid intermediates imidized by the desired ratios was dissolved in a mixed liquid of DMAc and cyclohexane to form the "coating liquids of COMPOSITION 2". Furthermore, each of the plurality of the solid intermediates imidized by desired ratios was dissolved in the mixed liquid of DMAc and cyclohexane, and a solid precursor not imidized was added to each liquid to form the liquids referred to as "coating liquids of COMPOSITION 3". Although not expressly described herein, for each of the coating liquids of COMPOSITION 1, the coating liquids of under all conditions for the coating liquids of COMPOSITION 1. However, the desired roughness was not formed on the surfaces of the coated layers under all conditions with the coating liquids of COMPOSITION 2 or with the coating liquids of COMPOSITION 3, but, rather, the surfaces of the coated layers were semispecular or specular.

Coating liquid No. 3 with an imidization ratio of 37% provided the desired roughness on the surfaces of the coated layers under some conditions with the coating liquids of COMPOSITION 1 and some conditions of the coating liquids of COMPOSITION 2. However, the desired roughness was not formed on the surfaces of the coated layers under any conditions with the coating liquids of COMPOSITION 3, but, rather, the surfaces of the coated layers were made semispecular or specular. Moreover, although roughness was formed on the surfaces of the coated layers with the coating liquids of COMPOSITION 1, there were some unfavorable conditions where the heights or pitches of the protrusions became too large thus causing unevenness thereon.

Coating liquid No. 4 with an imidization ratio of 50%, provided the desired roughness on the surfaces of the coated layers under all conditions with the coating liquids of COMPOSITION 2. On the contrary, under almost all conditions using the coating liquids of COMPOSITION 1, results were not favorable due to unevenness on the coated layers. In addition, results were not favorable under almost all conditions using the coating liquids of COMPOSITION 3, because the surfaces of the coated layers were semispecular or specular.

Coating liquid No. 5 with an imidization ratio of 75%, provided the desired roughness on the surfaces of the coated layers under all conditions using the coating liquids of COMPOSITION 2 and under some conditions using the coating liquids of COMPOSITION 3. Under some conditions using the coating liquids of COMPOSITION 3, there were cases where the surfaces of the coated layers were semispecular or specular. Moreover, results were not favorable under any conditions using the coating liquids of COMPOSITION 1, due to unevenness on the coated layers.

Coating liquid No. 6 with an imidization ratio of 90%, provided the desired roughness on the surfaces of the coating layers under all conditions using the coating liquids of COMPOSITION 3 and under some conditions using the coating liquids of COMPOSITION 2. Results were not favorable under any conditions using the coating liquids of COMPOSITION 1 and under other conditions of the coating liquids of COMPOSITION 2, due to unevenness on the coated layers.

Coating liquid No. 7 with an imidization ratio of 100%, provided no favorable results because the solid intermediates were not dissolved in the solvents.

As described above, when the imidization ratio of the solid intermediate derived from the partially imidized solid precursor is low, the surface of the coated layer tends to be specular or semispecular, depending on the composition of the coating liquid. On the contrary, when the imidization ratio is high, the heights or the spacings of the protrusions tend to be excessive, depending on the composition of the coating liquid, resulting in unevenness of the coated layer. Furthermore, when the imidization ratio is increased closer to 100%, the results were unfavorable because the solid intermediate was unlikely to dissolve in the solvent.

That is, the desired roughness will be formed on the surface of the coated layer 34 by using the coating liquid of COMPOSITION 1 with an imidization ratio near 30%, by using the coating liquid of COMPOSITION 2 with an imidization ratio in a range from about 37% to 75%, and by using the coating liquid of COMPOSITION 3 with an imidization ratio near 90%. Accordingly, a coated layer having the desired roughness can be formed by providing an imidization ratio for the solid intermediate derived from the partially imidized solid precursor in a range of about 30% to 90%, and by producing a coating liquid of a given composition in accordance with the imidization ratio.

Returning to the description of the second method of manufacturing a reflecting member, the coated layer 34 thus formed is subsequently completely cured by imidization in accordance with a method similar to the first method of manufacturing a reflecting member, and thus the polyimide layer 32a having a roughened surface is formed.

Subsequently, the Al layer 32b is formed on the rough surface of the polyimide layer 32a in accordance with a method similar to the first method of manufacturing a reflecting member.

(Third Method of Manufacturing a Reflecting Member)

The third method of manufacturing a reflecting member differs from the first and the second methods of manufacturing a reflecting member in use of an acrylic resin as the organic insulating layer.

In the third method of manufacturing a reflecting member, 500 g of acrylic base resin (SS6917: made by JSR Corporation), serving as the precursor of the organic insulating layer and 180 g of a curing agent are first mixed, and then this mixture is dissolved in a solvent to produce an acrylic precursor solution.

Thereafter, the acrylic precursor solution is subjected to heating at 115° C. for 5 minutes to partially cure the acrylic precursor, thus producing a solution containing a partially cured intermediate. A solvent such as ethyleneglycol monoethylether acetate can be used.

Thereafter, 250 g of uncured acrylic base resin and 90 g of the curing agent are additionally mixed with the solution containing the partially cured intermediate, thus producing a coating liquid.

This coating liquid is coated on a base member by a spin coating method at 1200 rpm, for example, whereby a coated layer is formed. In this way, similar to the first and the second methods of manufacturing a reflecting member, the intermediate derived from the partially cured acrylic precursor within the coated layer separates, whereby roughness is formed on a surface of the coated layer due to the intermediate.

Subsequently, the coated layer is heated at 220° C. to completely cure the acrylic resin, whereby an acrylic resin layer having surface roughness is formed similar to the polyimide layer 32a in FIG. 1A.

Subsequently, by forming an Al layer or the like on the rough surface of the acrylic resin layer similar to the first method of manufacturing a reflecting member, a reflecting member including the acrylic resin layer and the Al layer is provided.

(Fourth Method of Manufacturing a Reflecting Member)

A fourth method of manufacturing a reflecting member provides surface roughness by use of a precursor mixture solution of at least two kinds of precursors of the organic insulating layer based on phase separation upon curing of the precursors.

In the fourth method of manufacturing a reflecting member, the two kinds of polyimide precursors are first prepared. Pyromellitic dianhydride and 3-3'diaminodiphenylsulfone are subjected to condensation in dimethylacetoamide by a known method to form a first precursor solution containing 28% solids. Benzophenonetetracarboxylic dianhydride and 3-3'-diaminodiphenylsulfone are subjected to condensation in dimethylacetoamide by a known method to form a second precursor solution containing 28% solids.

Thereafter, the two polyimide precursor solutions are mixed in a weight ratio of 100 weight parts to 100 weight parts, thus preparing the mixed precursor solution. A diluent such as methylcellosolve or cyclohexane is added to the mixed precursor solution in the amount of 360 weight parts and the resulting mixture is well agitated to produce a coating liquid.

Subsequently, this coating liquid is coated on a base member by a spin coating method with rotation at 1600 to 2000 rpm for 30 seconds, or with rotation at 600 to 1000 rpm for 30 seconds, thus forming a layer of a thickness of about 0.5 to 5 μm, for example.

Instead of the spin coating method, a spray coating method, a reverse coating method or a gravure coating method can be used as a coating method.

Subsequently, the coated layer is air dried for 30 minutes. The resultant coated layer contains the two types of precursors having different characteristics. Accordingly, as the diluent in the coated layer evaporates, phase separation of the two types of precursors occurs, whereby a coated layer having surface roughness is formed.

Subsequently, by heating the coated layer in a clean oven at 200° C. for 60 minutes, the coated layer is completely cured, thus forming a polyimide layer having surface roughness. Similar to the polyimide layer 32a (FIG. 1B) of the first method of manufacturing a reflecting member, roughness is formed across the entire surface of the polyimide layer.

Similar to the first method of manufacturing a reflecting member, in this fourth method it is preferable that the heights of the protrusions of the polyimide layer and the planar spacings are formed at random on the surface of the layer. For example, the roughness of the polyimide layer may be formed with random heights in a range from 0.1 to 2 $\mu$m, and with planar spacings in a range from 2 to 20 $\mu$m.

Subsequently, the polyimide layer with the rough surface is air dried for 30 minutes similarly to the first method of manufacturing a reflecting member, and then an Al layer of a thickness of 50 to 100 $\mu$m is formed on the rough surface of the polyimide layer by vacuum deposition or the like.

Materials other than Al, such as those described in connection with the first method of manufacturing a reflecting member, can be used for the metal layer. Moreover, instead of the vacuum deposition method, a sputtering method, an ion plating method or the like can be used to form the metal layer.

Thus, a reflecting member for a reflective (semi-transmissive) liquid crystal display device can be manufactured by using any one of the above-described first to fourth methods.

(Reflection Characteristics of the Reflecting Member Manufactured According to the First or the Second Method)

FIG. 2A is a schematic cross-sectional view of the structure of a reflecting member for which reflection characteristics are evaluated. FIG. 2B is a schematic diagram showing a system for measurement of luminance of the reflecting member. FIG. 2C is a chart showing the reflection characteristics determined for the reflecting member. As shown in FIG. 2A, a polyimide layer 32a having a rough surface was first formed on a transparent glass substrate 42 in accordance with the first or the second method of manufacturing a reflecting member. Then, an aluminum layer 32b was formed on the rough surface of the polyimide layer 32a, to form a member 32 used as an evaluation sample.

Since the evaluation of the reflection characteristics stands on the assumption that the reflecting member 32 is to be transferred to an electrode base as described later, light was made incident on the transparent glass substrate 42 side of the reflecting plate 38 so that external light was diffused and reflected by the aluminum layer 32b after being transmitted through the polyimide layer 32a.

As shown in FIG. 2B, a luminance meter 44 was disposed facing the front of the transparent glass substrate 42 of the reflecting plate 38 and a light source 46 was also disposed in front of the transparent glass substrate 42, but closer to the side of the reflecting plate 38. An angle formed by incident light emitted from the light source 46 and reflected light was defined as an incident angle $\theta$. The light source 46 was moved between given positions so as to vary the incident angle $\theta$. White light was used as the light source 46, and the measurement system excluded a polarizing film.

With the light source emitting white light while varying the incident angle $\theta$ in a range from 7.4° to 35.6°, and the luminance of the light reflected by the reflecting member 32 was measured by the luminance meter 44, whereby luminance dependency on the incident angle $\theta$ was investigated.

In addition, a standard white diffusion plate of a ceramic type was prepared, and luminance dependency on the incident angle $\theta$ of the light reflected by the standard white diffusion plate was measured in the same manner as above, thus setting reference values for reflection luminance of light.

Subsequently, luminance values of the reflecting member 32 were divided by luminance values of the standard white diffusion plate, and then multiplied by 100. In other words, luminance values of the reflecting member 32 relative to the luminance value of the standard white diffusion plate set at 100, were obtained.

Subsequently, a reflecting member was prepared including a resist layer formed on a base member and having roughness on its surface and an aluminum layer formed on the resist layer. This reflecting member is of the type generally used as a reflecting member in a reflective liquid crystal display device, and was used herein as a comparative sample. Subsequently, dependency of luminance of light reflected by the comparative sample on the incident angle $\theta$ was investigated in a manner similar to the foregoing method, and then relative luminance values, relative to a luminance value of 100 for the standard white diffusion plate were obtained.

As shown in FIG. 2C, when the incident angle $\theta$ is 7.4°, 17.7° or 22.3°, the reflecting member 32 showed luminance values almost equal to those of the comparative sample, while the luminance values of the reflecting member were greater than those of the standard white diffusion plate by about 2.2 to 4.4 times.

In this way, it was found that the reflecting member 32 manufactured by the method of the present invention could obtain higher luminance than the standard white diffusion plate at almost any light incidence angle, and that the reflecting member 32 could enhance reflection luminance of incident light having a large angle $\theta$, i.e. incident light from a side of the reflecting member 32, higher than the comparative sample.

Furthermore, notwithstanding that the reflecting member 32 was evaluated with the incident light transmitted through the polyimide layer and then diffused and reflected, the reflecting member 32 showed higher reflection of light than the standard white diffusion plate. Accordingly, it was confirmed that the polyimide layer possessed high transparency and that such a structure did not incur any problems.

Needless to say, where light was made incident from the side of the aluminum layer 32b of the reflecting plate 38 in FIG. 2A, reflection characteristics equal to the above results of evaluation, or higher, were obtained.

Moreover, since the reflecting member 32 is composed of the polyimide layer having an overall uniform refractive index, it may function as a reflecting member with hardly any depolarization of light even where it is disposed in such a manner that the incident light is transmitted through the polyimide layer and then diffused and reflected therein.

In other words, luminance La in the case where polarizing films are disposed on the side of the light source as well as the side of the luminance system in a manner that polarization axes thereof are made parallel to each other and luminance Lb in the case where polarizing films are disposed on the side of the light source as well as the side of the luminance system in a manner that polarization axes thereof are made perpendicular to each other are both measured. Subsequently, a value La/Lb (a contrast ratio) is calculated, and the La/Lb value is greater than that of a conventional reflecting member which includes resins of different refractive indices. It means that with the reflecting member according to the present invention, depolarization is unlikely to occur.

(Method of Manufacturing an Electrode Base Member for a Liquid Crystal Display Device)

Figure 3A:
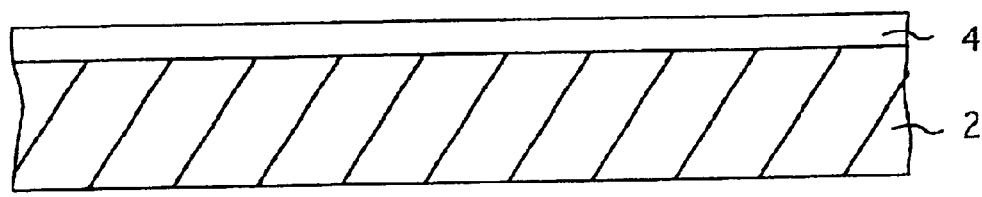
FIG. 3A to FIG. 3F are partial cross-sectional views for showing stages in manufacture of an electrode base member for a liquid crystal display device according to the first embodiment of the present invention.

In the manufacture of an electrode base member for a liquid crystal display device according to the first embodiment of the present invention, as shown in FIG. 3A, a heat-resistant glass 2 of a thickness of, for example, about 0.7 to 1.1 mm is used as a substrate.

Then, a release layer 4 made of polyimide resin of a thickness of 4 $\mu$m, for example, is formed on the glass substrate 2.

Figure 3B:
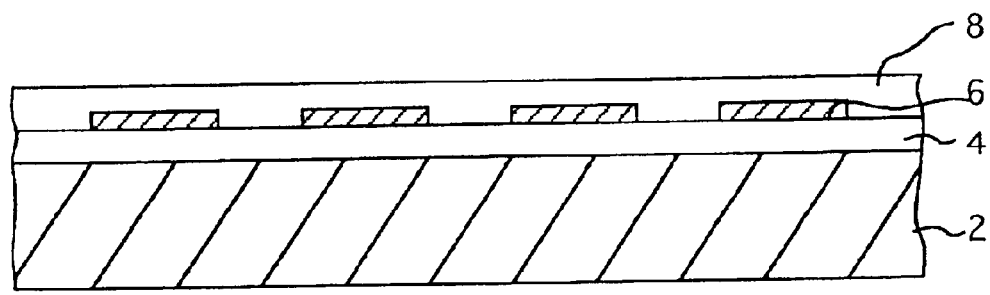

Subsequently, as shown in FIG. 3B, an indium tin oxide (ITO) layer of a thickness of 0.1 to 0.4 $\mu$m is formed on the release layer 4 by a sputtering method. Then, the ITO layer is patterned by means of photolithography and etched to form stripe-shaped first transparent electrodes 6.

Subsequently, a coating liquid of a thermosetting acrylic resin, for example, is coated on the release layer 4 and on the first transparent electrodes 6 by a spin coating method, thus forming a coated layer. Thereafter, the coated layer is heated and cured, whereby a protective layer 8 of a thickness of, for example, 2 to 5 $\mu$m is formed.

Figure 3C:
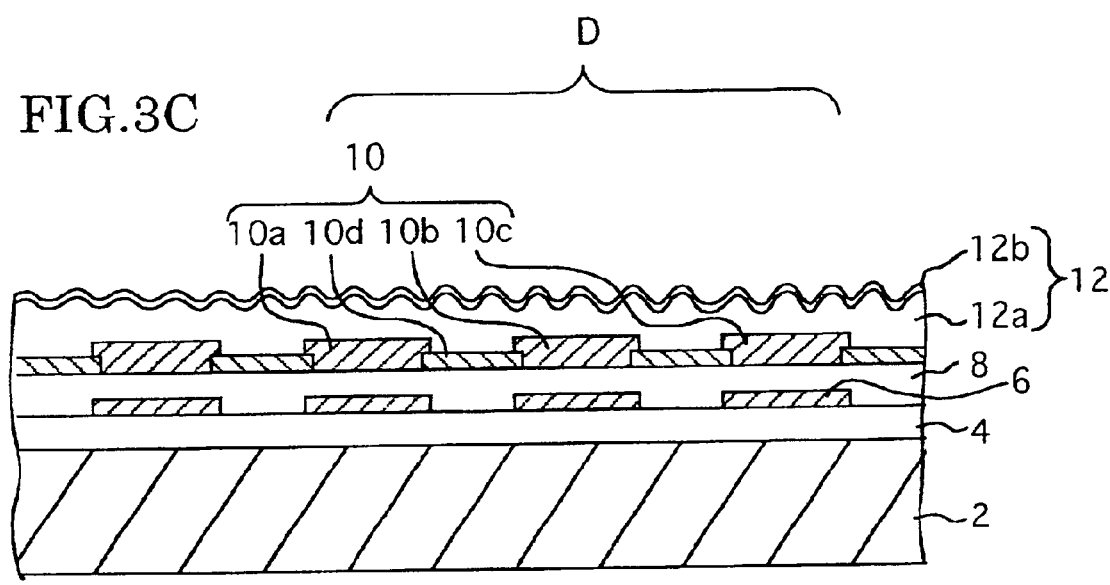

Subsequently, as shown in FIG. 3C, either a resist layer with black pigment dispersed therein or a polyimide layer with black dye dissolved therein is formed on the protective layer 8. Then, it is patterned to form light-shielding layers 10d in the spaces between the first transparent electrodes 6, the light-shielding layers 10d having larger widths than the widths of the spaces between the first transparent electrodes 6.

Next, above one of the first transparent electrodes 6 and on the protective layer, a red color filter layer 10a for a red pixel is formed on the spaces between the light-shielding layers 10d by coating a photosensitive red solution of dispersed pigment type and by subsequent exposure and development. Edge portions of the red color filter layer 10a overlap the light-shielding layers 10d.

Subsequently, a green color filter layer 10b is formed in an area for a green pixel by coating a photosensitive green solution of a dispersed pigment type and by subsequent exposure and development.

Subsequently, a blue color filter layer 10c is formed in an area for a blue pixel by coating a photosensitive blue solution of a dispersed pigment type and by subsequent exposure and development.

In this way, a color filter layer 10 is formed including the striped red color filter layer 10a, green color filter layer 10b and blue color filter layer 10c, respectively parallel to the first transparent electrodes 6, and the light-shielding layers 10d.

Subsequently, by using any one of the above-described first to fourth methods of manufacturing a reflecting member, a resin layer 12a having a rough surface made of a polyimide layer or acrylic resin is formed on the color filter 10, and then an Al layer 12b or other metal layer is formed on the resin layer 12a. A reflecting member 12 is thereby formed on the color filter 10.

In the case of manufacturing an electrode base member for a semi-transmissive liquid crystal display device capable of using both light from a backlight and reflected external light from the reflecting member, the following steps may be added after the aluminum layer 12b is formed on the rough surface of the resin layer 12a.

First, on the aluminum layer 12b, in regions to become pixel portions of the first transparent electrodes 6, that is, in regions where the first transparent electrodes 6 and second transparent electrodes 6a cross perpendicular to each other (shaded areas in FIG. 4A), a resist layers (not shown) are formed by photolithography, the second transparent electrodes 6a being formed on a side of the base member opposite the first transparent electrodes 6 formed thereon. Specifically, the resist layer is patterned so as to form opening patterns. Each of the openings has an area smaller than the area of the region to become the pixel, the area of the opening being, for example, about 10% of the area of the pixel.

Figure 4A:
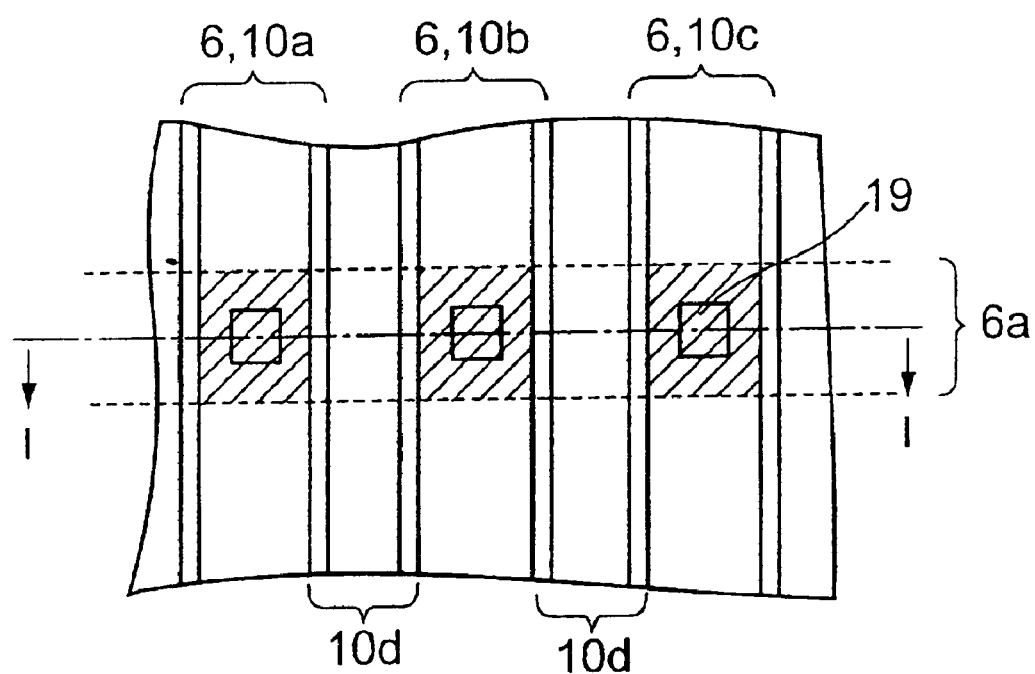
FIG. 4A is an enlarged perspective diagram of a portion D of FIG. 3C.
Figure 4B:
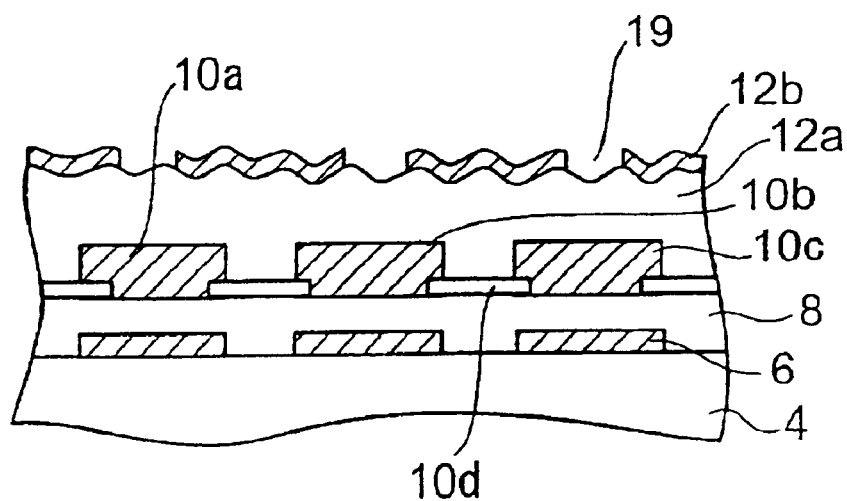
FIG. 4B is a cross-sectional view of FIG. 4A taken along the line I—I.

Thereafter, as shown in FIGS. 4A and 4B, using this resist layer as a mask, the Al layer 12b exposed on bottoms of the openings of the resist layer is removed by wet etching, thereby forming open windows 19. In this way, the windows 19 are formed in centers of the pixels, each window having an area of about 10% to 20% of the area of the pixel.

When the backlight is used as a light source, light from the backlight is transmitted through the windows 19 open at the pixel portions (the shaded parts in FIG. 4A), whereby liquid crystal images can be obtained. On the other hand, when light dispersed and reflected by the reflecting member 12 is used, the light being from an external light source incident on the liquid crystal screen, the external light is reflected in areas around the pixel portions (the shaded parts in FIG. 4A), i.e., in areas other than the windows 19 occupied by the remaining parts of the aluminum layer 12b. Accordingly, liquid crystal display images can be obtained.

As described above, by addition of the above-described steps on the glass substrate, 2 and by use of transfer technology as described later, the electrode base member for the semi-transmissive liquid crystal display device can be readily manufactured.

In the case of forming the reflecting member 12, the first transparent electrodes 6 and the like directly on a plastic film, the plastic film expands and contracts due to heat or humidity during the manufacturing processes and also requires a long period of time to be stabilized. Accordingly, the windows 19 where the aluminum layer 12b is partially removed and the portions which become the pixels of the transparent electrodes 6 become difficult to align with precision so as to overlap each other, and formation of the patterns of the transparent electrodes 6 above the aluminum layer 12b becomes difficult.

Figure 3D:
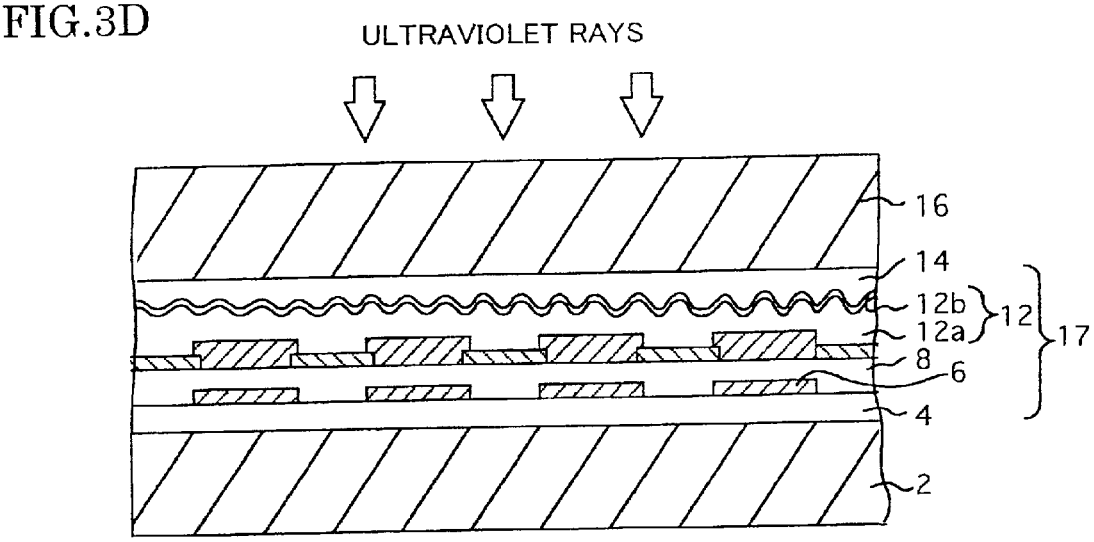

Subsequently, as shown in FIG. 3D, ultraviolet-curing resin (KR-360: made by Asahi Denka Kogyo K.K.) Is blended and dispersed with a small amount of spacer particles with a particle diameter in a range from 2 to 15 $\mu$m (Epostar GP-H: made by Nippon Shokubai Co. Ltd.) and is sprayed on the reflecting member 12 to form an adhesive layer 14 having a thickness in a range from 2 to 15 $\mu$m. In this manner, the roughness on the surface of the reflecting member 12 is completely filled with the adhesive layer 14 and a flat surface is formed.

In this way, a transfer layer 17 is formed, including the release layer 4, the first transparent electrodes 6, the protective layer 8, the color filter layer 10, the reflecting member 12 and the adhesive layer 14, which are serially stacked on the glass substrate 2.

A method of transferring the transfer layer 17 formed on the glass substrate 2 onto the plastic film will next be described.

A plastic film 16 (a polyethersulfone film: made by Sumitomo Bakelite Co. Ltd.) with a thickness of 100 to 200 $\mu$m, for example, is prepared and then cleaned by water with an ultrasonic washer and dried, and then it is further placed in a clean room and dried for up to two days.

Then, as shown in FIG. 3D, the plastic film 16 is placed on the adhesive layer 14 of the transfer layer 17 formed on the glass substrate 2.

Subsequently, 3000 mJ/cm² of ultraviolet rays with a wavelength of 365 nm, for example, are irradiated by a high-pressure mercury-vapor lamp from the side of the plastic film 16, whereby the adhesive layer 14 made of photocuring resin is cured so as to adhere the plastic film 16 to the transfer layer 17.

In this procedure, contraction occurs in the plastic film due to an increase in its temperature during transferring and a decrease in its temperature upon completion of transferring. Accordingly, dimensions of the formed patterns may be varied. In the case where such variation causes a problem, a pulse xenon light source may be used instead. The pulse xenon light source has a high light emission intensity and is capable of curing the adhesive layer with less irradiation time. Accordingly, a temperature increase of the plastic film associated with the irradiation can be thereby suppressed. In this way, the variation in the dimensions of the patterns can be reduced.

Figure 3E:
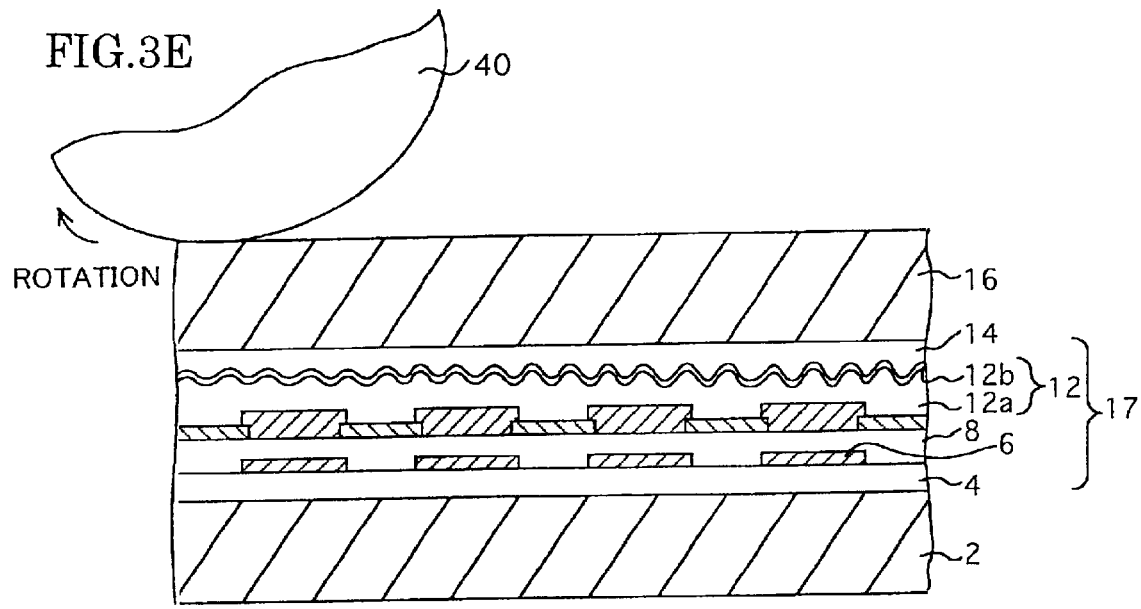

Subsequently, as shown in FIG. 3E, one end of the plastic film 16, the end being adhered to the adhesive layer 14, is fixed to a roll 40 having a diameter of 200 mm, for example, and the plastic film 16 is peeled off while rotating the roll 40. In this manner, the transfer layer 17 is peeled off the glass substrate 2 at the interface of the glass substrate 2 and the release layer 4, and thus the transfer layer 17 is transferred to the plastic film 16.

Subsequently, the plastic film 16, to which the transfer layer 17 has been transferred, is either soaked in an alkali mixture solution obtained by mixing hydrazine and ethylenediamine in a ratio of 1:1, or is subjected to oxygen plasma treatment, whereby only the release layer 4 on the plastic film 16 is removed.

Thereafter, an alignment layer 18 for aligning a liquid crystal material is formed in a thickness not greater than 100 nm, for example, on the first transparent electrodes 6 as well as on the protective layer 8. Then, a surface of the alignment layer 18 is subjected to rubbing treatment.

Figure 3F:
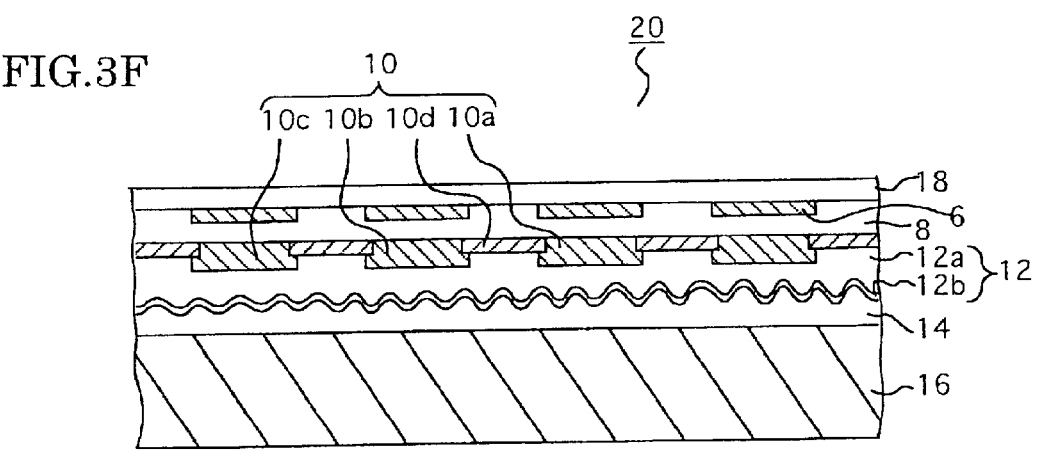

As described above, a scanning electrode base member for the liquid crystal display device according to the embodiment is completed as shown in FIG. 3F.

In this embodiment of the method of manufacturing an electrode base member for a liquid crystal display device, the transfer layer 17 is formed on the heat-resistant glass substrate 2 in advance, and then the transfer layer 17 is transferred to the plastic film 16. Accordingly, formation of the first transparent electrodes 6 and the reflecting member 12 is not restricted by heat. In this way, the electrode base member using the plastic film in the base member can be readily manufactured in accordance with design demands.

In the case of directly forming the reflecting member 12, the color filter layer 10 and the first transparent electrodes 6 serially on the plastic film, there is a risk that chemicals used in the steps of forming the color filter 10 or forming the first transparent electrodes 6 might permeate downward and thereby damage the aluminum layer 12b of the reflecting member 12.

However, since transfer technology is utilized in the manufacturing method of the first embodiment, the reflecting member 12 is formed after the formation of the first transparent electrodes 6 and the color filter layer 10. Therefore, since there are no steps involving chemical treatment after the formation of the reflecting member 12, the aluminum layer 12b of the reflecting member 12 is not damaged by the chemicals.

In addition, since the roughness of the reflecting member 12 is completely covered by the adhesive layer 14, no planarization process is necessary.

Furthermore, since the glass substrate does not expand nor contract with heat or temperature like the plastic film, alignment between patterns of the respective layers can be readily achieved. In other words, openings for transmitting the light from the backlight, i.e. the windows (the openings) of the metal layer, can be readily formed as well aligned with precision in accordance with the design demands within the portions of the reflecting member 12 corresponding to those portions of the first transparent electrodes 6 which become the pixels. Specifically, the openings for transmitting the backlight have areas smaller than the areas of the regions of the first transparent electrode which become the pixels.

Next, a method of manufacturing a signal electrode base on the side of the base member opposite the scanning electrode base member 20, and a method of manufacturing a liquid crystal display device using such electrode base members will be described with reference to FIG. 5 which is a schematic cross-sectional view showing a liquid crystal display device, including the electrode base members manufactured in accordance with the method according to the first embodiment of the present invention.

Figure 5:
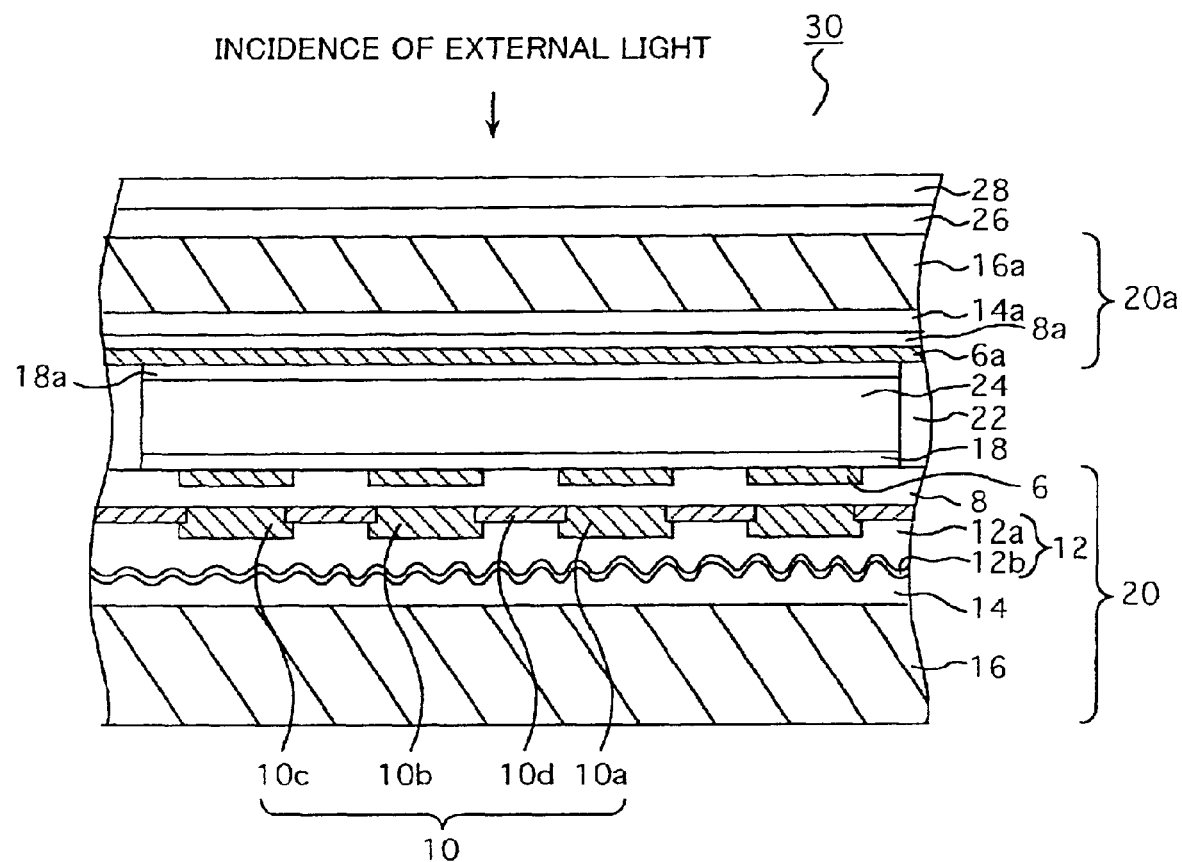
FIG. 5 is a schematic cross-sectional view showing a liquid crystal display device including the electrode base members manufactured by the method of the first embodiment of the present invention.

First, as shown in FIG. 5, by use of a method similar to the above-described transferring method, an adhesive layer 14a, a protective layer 8a and second transparent electrodes 6a are serially formed on a second plastic film 16a. Subsequently, an alignment layer 18a is formed on the second transparent electrodes 6a Then a surface of the alignment layer 18a is subjected to a rubbing treatment, whereby a signal electrode base member 20a of the side of the base member opposite the scanning electrode base member 20 is produced.

Thereafter, a sealing agent for sealing a liquid crystal material is applied to either the scanning electrode base member 20 or the signal electrode base member 20a by use of a dispenser apparatus, thus forming a sealing layer 22.

Subsequently, adhesive spacers with a particle diameter of about 5 μm are applied to the electrode base member on which the sealing layer 22 is formed.

Subsequently, the other electrode base member is aligned with the electrode base member with the sealing layer 22 formed thereon; accordingly, the electrode base members are stacked and then heated. In this manner, a certain interval is secured between the two electrode base members owing to presence of the adhesive spacers.

Subsequently, the liquid crystal material is injected into the space between the scanning electrode base member 20 and the signal electrode base member 20a from a liquid crystal inlet bored in the sealing layer 22 in advance, and then the liquid crystal inlet is hermetically sealed with a sealant to form a liquid crystal layer 24.

Subsequently, a phase difference film 26 is disposed on a surface of the signal electrode base member 20a opposite the liquid crystal layer 24, and then a polarizing film 28 is disposed on the phase difference film 26.

In this way, a liquid crystal display device 30 of the first embodiment as shown in FIG. 5 is completed.

In the liquid crystal display device 30, including the electrode base members 20 and 20a manufactured according to the first embodiment, the reflecting member 12 is formed on the plane of the plastic film 16 facing toward the liquid crystal layer 24. Accordingly, the external light diffused and reflected by the reflecting member 12 can be transmitted through the liquid crystal layer 24 without being transmitted through the plastic film 16. Thereafter, the reflected light is transmitted through the signal electrode base member 20a then through the phase difference film 26 and the polarizing film 28, and is emitted from the liquid crystal screen.

In other words, the external light diffused and reflected is not affected by the thickness of the plastic film 16. Therefore, defocused images attributed to occurrence of parallax can be prevented in a liquid crystal display device including a color filter and pixels, each pixel being divided into three color dots one-third the size of the pixel.

Moreover, since the rough resin layer 12a made of a polyimide or the like and which constitutes part of the reflecting member 12, is formed of a single material, the refractive index across the entire resin layer 12a can be made uniform. Accordingly, the degree of polarization of the light is not reduced even when the external light or the reflected external light is transmitted through the resin layer 12a, thus enhancing the contrast ratio of the liquid crystal display screen.

Second Embodiment

Figure 6:
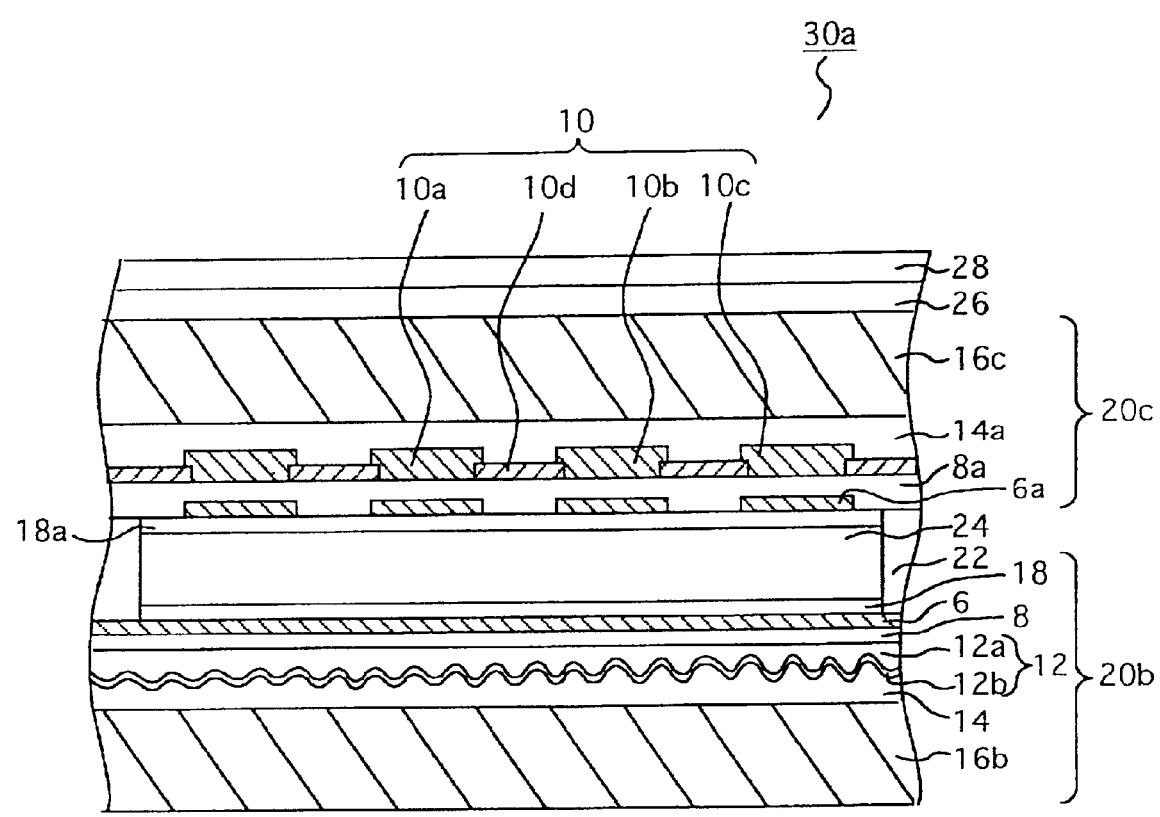
FIG. 6 is a schematic cross-sectional view showing a liquid crystal display device including electrode base members manufactured in accordance with the method of a second embodiment of the present invention.

FIG. 6 is a schematic cross-sectional view showing a liquid crystal display device including electrode base members manufactured according to a second embodiment.

The difference between the second embodiment and the first embodiment lies in provision of a color filter layer on a signal electrode base member. Therefore, in FIG. 6, the same components as those in FIG. 5 are denoted with the same numbers, and the detailed description thereof will be omitted.

A method of manufacturing a scanning electrode base member 20b will first be described with reference to FIG. 6. Detailed description of steps similar to those in the first embodiment is omitted.

In accordance with a method similar to the manufacturing method of the first embodiment, a transfer layer is serially formed of a release layer, first transparent electrodes 6, a protective layer 8, a reflecting member 12 and an adhesive layer 14 is formed on a glass substrate. Thereafter, the transfer layer is transferred onto a plastic film 16b with the adhesive layer 14 interposed therebetween. Subsequently, an alignment layer 18 is formed on the transparent electrodes 6 above the plastic film 16b with the transfer layer formed thereon, and a surface of the alignment layer 18 is subjected to a rubbing treatment to complete the scanning electrode base member 20b.

A method of manufacturing a signal electrode base member 20c will next be described with reference to FIG. 6.

In accordance with a method similar to the manufacturing method of the first embodiment, a transfer layer is serially formed of a release layer, second transparent electrodes 6a, a protective layer 8a, a color filter layer 10 and an adhesive layer 14a, on a glass substrate.

Thereafter, the transfer layer is transferred onto a plastic film 16c with the adhesive layer 14a interposed therebetween. Subsequently, an alignment layer 18a is formed on the second transparent electrodes 6a below the plastic film 16c with the transfer layer formed thereon, and the alignment layer 18a is subjected to a rubbing treatment to complete the signal electrode base member 20c.

Subsequently, according to a method similar to that of the first embodiment, the scanning electrode base member 20b and the signal electrode base member 20c are adhered with a sealing layer 22 interposed therebetween and a liquid crystal material is injected therebetween, thus forming a liquid crystal layer 24.

Subsequently, a phase difference film 26 and a polarizing film 28 are disposed on a surface of the signal electrode base member 20c opposite the liquid crystal layer 24. In this way, a liquid crystal display device 30a including the color filter provided in the signal electrode base member 20c is completed.

Although the present invention has been described in detail in accordance with the first and the second embodiments, it should be understood that the scope of the present invention is not limited by the examples of the above-described embodiments, and any modification or alteration within the scope of the gist of the present invention is included within the scope of the present invention.

For example, in the methods of manufacturing an electrode base member according to the first and second embodiments, the adhesive layer 14 is formed on the reflecting member 12 on the glass substrate 2, and the transfer layer including the reflecting member 12, etc. is transferred onto the plastic film 16 with the adhesive layer 14 interposed therebetween. However, the adhesive layer 14 may be formed on a surface of the plastic film 16 to which the transfer layer is to be transferred, and the transfer layer may be transferred by adhering to the surface of the plastic film 16 with the adhesive layer 14 formed thereon.

Moreover, as another embodiment apart from the first and the second embodiments, a reflecting member may be formed directly on a plastic film and other layers such as transparent electrodes may be formed on a glass substrate as a transfer layer, whereby the transfer layer on the electrode base member may be also formed by transferring the transfer layer from the glass substrate onto the reflecting member on the plastic film with the adhesive layer interposed therebetween.

In this latter embodiment, roughness of the reflecting member is formed by direct spin coating of a coating liquid on the plastic film, the coating liquid containing fillers such as silica or calcium carbonate with a particle diameter of 1 to 10 $\mu$m as well as resin such as alkyd resin, which are dispersed in thinner. Thereafter, a metal layer made of aluminum or the like may be formed on the rough surface of the resin layer, thus obtaining the reflecting member.

Moreover, while the method of manufacturing a reflecting member of the previous embodiments involves forming the roughness on the surface of the reflecting member based on partial curing of the precursor of one type of resin, precursors of two or more different types of resin may used herein, in which case it is preferable to use two or more types of resin that provide a virtually uniform refractive index within the resin layer of the reflecting member ultimately formed.

In the above-described embodiments, the reflecting member, etc., are formed above the glass substrate and then transferred onto the plastic film. However, utilizing the method of the present invention, the reflecting member can be formed on any type of object.

What is claimed is:

1. A method of manufacturing an electrode base member for a liquid crystal display device, comprising the steps of:
   forming a release layer on a glass substrate;
   forming a transparent electrode on the release layer;
   forming, above the transparent electrode, a reflecting member having roughness on a surface thereof for reflecting light incident thereon; and
   adhering a plastic film on the reflecting member via an adhesive layer;
   completing transfer of the reflecting member, the transparent electrode, and the release layer from the glass substrate onto the plastic film, by removing the glass substrate to expose the release layer; and
   removing the exposed release layer.

2. The method according to claim 1, comprising the additional step of forming a protective layer on the transparent electrodes, after the step of forming a transparent electrode and before the step of forming a reflecting member.

3. The method according to claim 2, comprising the additional step of forming a color filter layer on the protective layer, after the step of forming a protective layer and before the step of forming a reflecting member.

4. The method according to claim 1,
wherein the step of forming a reflecting member includes the steps of:
forming an organic insulating layer having the roughness on a surface thereof; and
forming a metal layer on the surface having the roughness of the organic insulation layer.

5. The method according to claim 4, comprising the additional step of removing a portion of the metal layer, the portion of the metal layer corresponding to a portion to become a pixel of the transparent electrode and the portion of the metal layer being a smaller than an area of the portion to become the pixel.

6. The method according to claim 4, wherein the organic insulating layer is formed from a polyimide precursor, at least two types of polyimide precursors or a precursor of acrylic resin.

7. The method according to claim 4, wherein the metal layer includes at least one metal selected from the group consisting of aluminum, titanium, silver, platinum, tantalum and palladium.

8. The method according to claim 1 wherein the roughness of the surface is provided by protrusions having heights of 0.2–0.4 µm.

9. The method according to claim 1 wherein the release layer is removed by treatment with an oxygen plasma.

10. The method according to claim 1 further comprising:
after removal of the release layer, forming an alignment layer on the composite structure.

11. An electrode base member for a liquid crystal display device comprising a plastic film base, an adhesive layer on the plastic film base, a reflecting member above the adhesive layer, the reflecting member having roughness on a surface thereof for diffusing and reflecting light incident thereon, and a transparent electrode above the reflecting member, the electrode base member manufactured by a method comprising the steps of:
forming a release layer on a glass substrate;
forming the transparent electrode on the release layer;
forming the reflecting member having the surface with roughness above the transparent electrode;
adhering the plastic film base on the reflecting member via the adhesive layer;
completing transfer of the reflecting member, the transparent electrode and the release layer, from the glass substrate onto the plastic film base with the surface having roughness facing the plastic film, by removing the glass substrate to expose the release layer; and
removing the exposed release layer.

12. An electrode base member according to claim 11 wherein the roughness of the surface is provided by protrusions having heights of 0.2–0.4 µm.

13. A liquid crystal display device including a first electrode base member, a second electrode base member and a liquid crystal layer filled between the first electrode base member and the second electrode base member,
wherein at least any one of the first electrode base member and the second electrode base member comprises a plastic film base, an adhesive layer on the plastic film base, a reflecting member above the adhesive layer with a surface roughness facing the plastic film base, and a transparent electrode above the reflecting member and wherein the reflecting member has roughness on a surface thereof for diffusing and reflecting light incident thereon and wherein said at least one electrode base member is manufactured by a method comprising the steps of:
forming a release layer on a glass substrate;
forming the transparent electrode on the release layer;
forming the reflecting member having the surface with roughness above the transparent electrode;
adhering the plastic film base on the reflecting member via the adhesive layer;
completing transfer of the reflecting member, the transparent electrode and the release layer, from the glass substrate onto the plastic film base, by removing the glass substrate to expose the release layers; and
removing the exposed release layer.

14. A liquid crystal display device according to claim 13 wherein roughness of the surface is provided by protrusions having heights of 0.2–0.4 µm.

* * * * *

UNITED STATES PATENT AND TRADEMARK OFFICE
CERTIFICATE OF CORRECTION

PATENT NO. : 6,897,921 B2
DATED : May 24, 2005
INVENTOR(S) : Furukawa et al.

It is certified that error appears in the above-identified patent and that said Letters Patent is hereby corrected as shown below:

<u>Title page,</u>
Item [57], ABSTRACT,
Line 8, "and" should read -- the --.

<u>Column 23,</u>
Line 16, "a smaller" should read -- smaller --.

<u>Column 24,</u>
Line 40, "layers" should read -- layer --.

Signed and Sealed this

Second Day of May, 2006

JON W. DUDAS
*Director of the United States Patent and Trademark Office*